Figure 1:
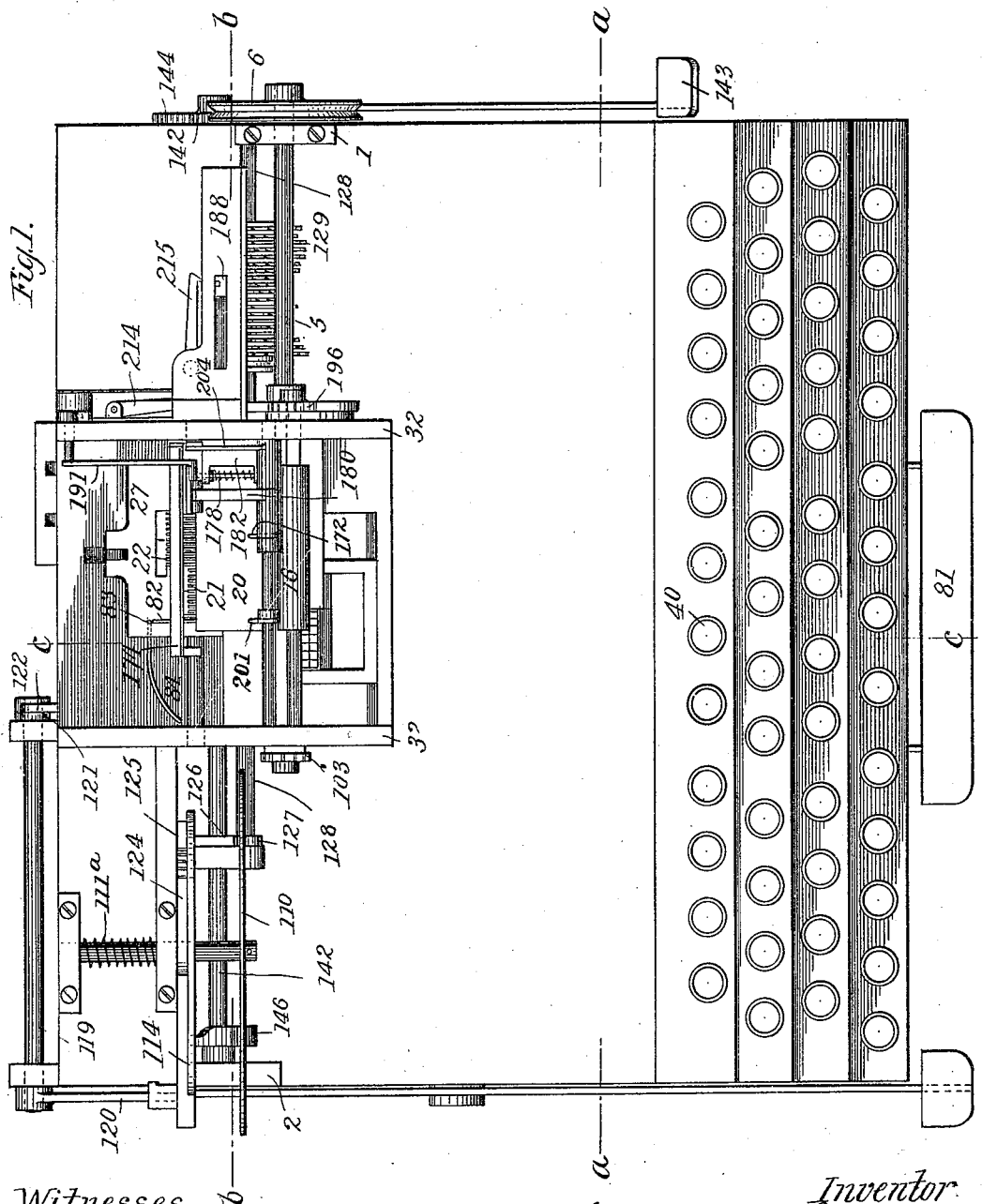

(No Model.) 10 Sheets—Sheet 1.
F. A. JOHNSON.
MACHINE FOR MAKING CONTROLLERS FOR COMPOSING MACHINES.
No. 545,697. Patented Sept. 3, 1895.

Witnesses
J. G. Hinkel
Robert Watson

Inventor
Frank Amos Johnson
By J. Watson, atty (No Model.)  
10 Sheets—Sheet 2.

F. A. JOHNSON.  
MACHINE FOR MAKING CONTROLLERS FOR COMPOSING MACHINES.

No. 545,697.  
Patented Sept. 3, 1895.

Witnesses  
J. G. Hinkel  
Robert Watson

Inventor  
Frank Amos Johnson  
By J. Watson, atty (No Model.)  
10 Sheets—Sheet 4.

F. A. JOHNSON.
MACHINE FOR MAKING CONTROLLERS FOR COMPOSING MACHINES.

No. 545,697.  Patented Sept. 3, 1895.

Witnesses  
J. G. Hinkel  
Robert C. Walton

Inventor  
Frank Amos Johnson  
By J. A. Watson, atty (No Model.)  10 Sheets—Sheet 7.
F. A. JOHNSON.
MACHINE FOR MAKING CONTROLLERS FOR COMPOSING MACHINES.
No. 545,697. Patented Sept. 3, 1895.
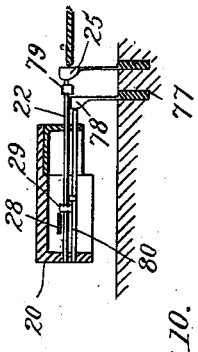
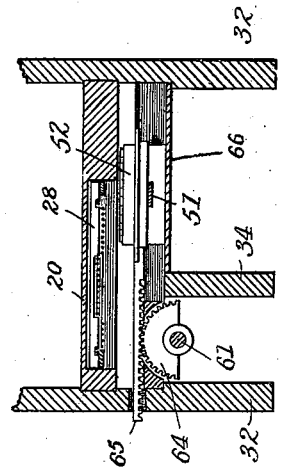
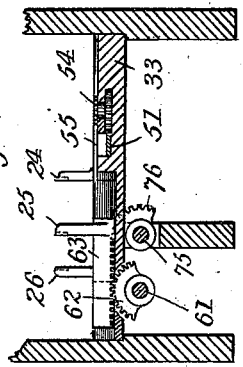
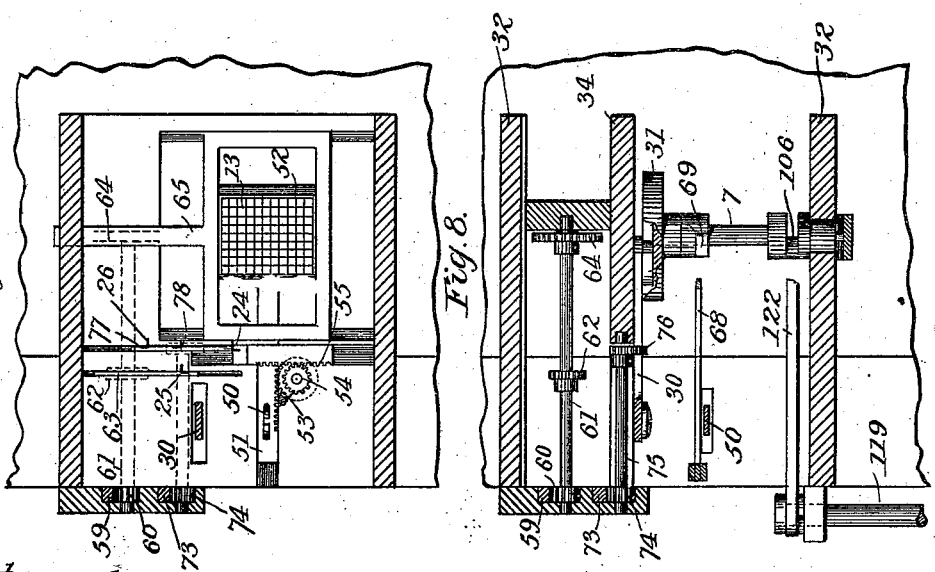
Witnesses
J. G. Hinkel
Robert Watson
Inventor
Frank Amos Johnson
By J. H. Watson, atty (No Model.) 10 Sheets—Sheet 8.
F. A. JOHNSON.
MACHINE FOR MAKING CONTROLLERS FOR COMPOSING MACHINES.
No. 545,697. Patented Sept. 3, 1895.
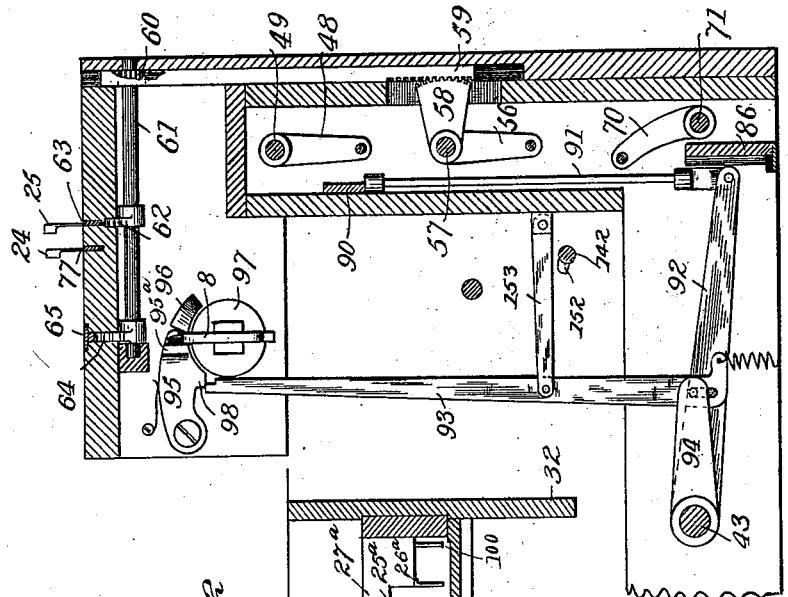
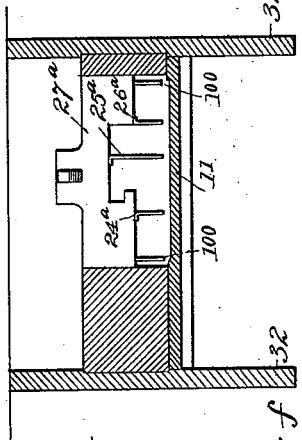
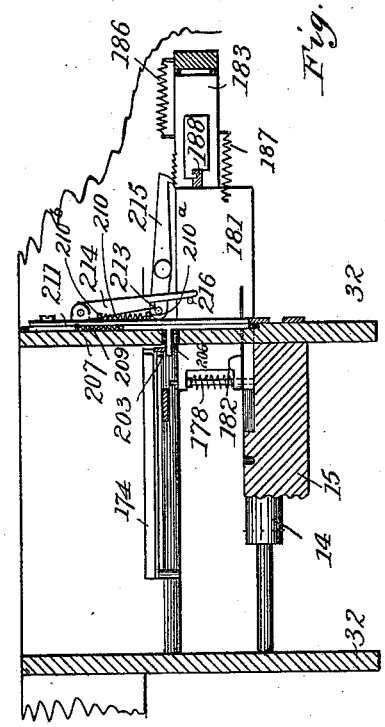
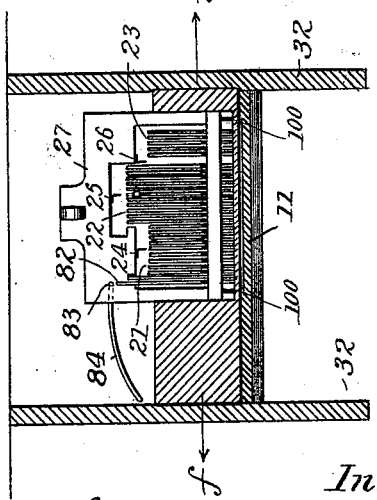
Witnesses
J. G. Hinkel
Robert Watson
Inventor
Frank Amos Johnson
By J. Watson, atty.

(No Model.) 10 Sheets—Sheet 9.
F. A. JOHNSON.
MACHINE FOR MAKING CONTROLLERS FOR COMPOSING MACHINES.
No. 545,697. Patented Sept. 3, 1895.
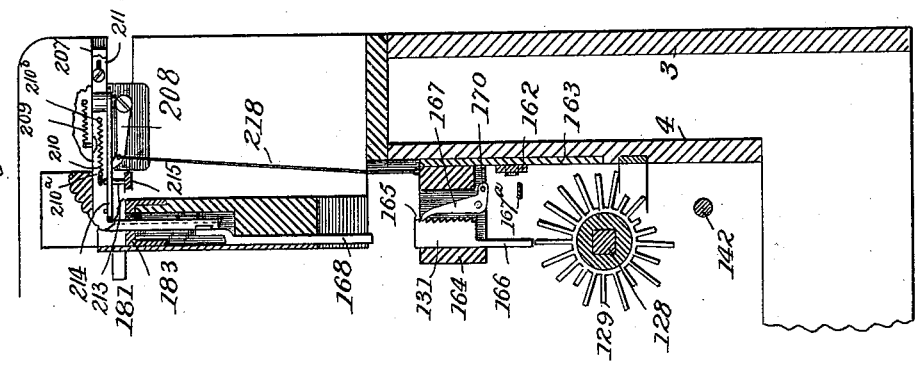
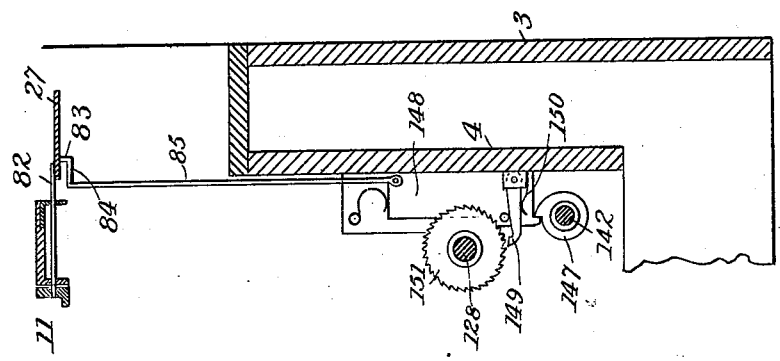
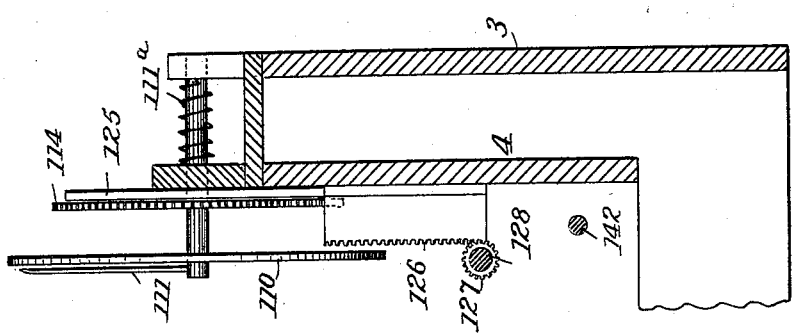
Witnesses
J. G. Hinkel
Robert Watson
Inventor
Frank Amos Johnson
By J. Watson atty (No Model.)
10 Sheets—Sheet 10.

F. A. JOHNSON.
MACHINE FOR MAKING CONTROLLERS FOR COMPOSING MACHINES.

No. 545,697.  Patented Sept. 3, 1895.

Witnesses
J. G. Hinkel.
Robert Watson

Inventor
Frank Amos Johnson
By J. H. Watson atty

United States Patent Office.

FRANK AMOS JOHNSON, OF PHILADELPHIA, PENNSYLVANIA, ASSIGNOR TO THE TACHYTYPE MANUFACTURING COMPANY, OF MINNEAPOLIS, MINNESOTA.

MACHINE FOR MAKING CONTROLLERS FOR COMPOSING-MACHINES.

SPECIFICATION forming part of Letters Patent No. 545,697, dated September 3, 1895.

Application filed May 9, 1894. Serial No. 510,661. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in Machines for Making Controllers for Composing-Machines, of which the following is a specification.

My invention relates to machines for making controllers for composing-machines. In the present instance the controller manufactured is in the form of a ribbon or strip of paper or similar fabric in which are transverse lines of perforations. Two perforations in each line represent a character, a third perforation represents the space required by the character, and two other perforations may, if desired, be added to co-operate with pins on the feed-rolls. In other transverse lines, which separate the word-impressions, are perforations representing the word-spaces necessary to justify the lines, and between the lines of subject-matter are other perforations by which said lines are separated.

As it is difficult or almost impossible to read the subject-matter from the perforations, I provide the strip with a type-written index, the character represented by each transverse line of perforations being plainly printed adjacent to said line. The strip thus produced may be easily read and corrected, if necessary, by cutting out errors and inserting pieces properly perforated or by changing the perforations in the original strip.

The controller-strip above described may be termed a "justified controller," inasmuch as the justification is completed by the perforating machine and represented on the strip. This strip may afterward be used in any of the various composing-machines to produce justified matter without encumbering said machines with justifying mechanism. Thus it may be used in a linotype-machine to set up justified lines of matrices, in a matrix-machine to produce justified lines of impressions, in a type-writer to produce justified lines of print, and in either a type-setting machine or a type casting and composing machine to produce justified lines of type. In these machines the strip simply governs the selection of the proper spaces required to justify the lines; but the estimating of the spaces or the justifying is performed by my present machine.

The principal features of the machine may be enumerated as follows:

First. There is a set of keys and key-levers similar to those of a type-writer, and there is for each character represented in the machine a slide operated by its corresponding key-lever and provided with three cams or cam-surfaces. Two of these cams select a character, and the third cam represents the space occupied by the character.

Second. There is a die over which the strip is made to pass by suitable feeding devices step by step, and opposite the die are two sets of punches for making character-selecting impressions and a set of punches for making space-impressions in the strip. There are also two special punches, one of which is controlled by the space-key to make an arbitrary impression indicating a space between words, while the other is controlled by a starting-key, and makes impressions which indicate the division of the strip into lines. In the rear of all of these punches is a common striker. The punches are brought into action by means of interponents, which are arranged between the striker and the punches and are movable to select particular punches. The interponents for the character-selecting punches are controlled by the upper and middle cam-surfaces of the slides, and a set of type is also simultaneously controlled by these cams, the effect being that when a character-key is depressed the punches for that character are selected by the interponents, and at the same time the corresponding character in the set of type is brought to the printing-point and its impression made upon the strip adjacent to the perforations. The third cam of the slide, corresponding to the selected character, simultaneously places an interponent opposite the proper space-punch and a perforation representing the space or width of the character is made in the strip.

Third. The third or space-cam surface also operates a dial and index to show the amount of space added to the line by its character, and at the same time it operates upon a justifier, which is employed to determine the proper distribution of space to cause the line to justify. The justifier is influenced both by the character-spaces and by the number of word-spaces, another movement being imparted to it each time the word-space key is depressed. The depression of the space-key also brings into action a special punch, which makes a perforation to indicate a space between words. The function of this special space-perforation is to afterward trip or bring into action the justifying-punch, which makes the proper space-perforations. Another special punch makes a perforation at the end of each line of subject-matter, which determines the separation of the lines, and may be called the "line-hole."

Fourth. While a line of subject-matter is being placed upon the strip the justifier is being set accordingly, and when the end of the line is reached, which will be indicated by the dial, a "starting-key" is depressed and the setting of the justifier is transferred to a second and independent perforating mechanism, through which the same line of subject-matter is again passed to be justified—that is, to receive perforations representing such word-spaces as will properly fill out the line in the final or composing machine. This second perforator is brought into action each time a word-space-indicating perforation passes it, and it makes an additional perforation which selects a proper space to justify the line.

I shall now proceed to describe my invention in detail, reference being had to the accompanying drawings, in which—

Figure 2:
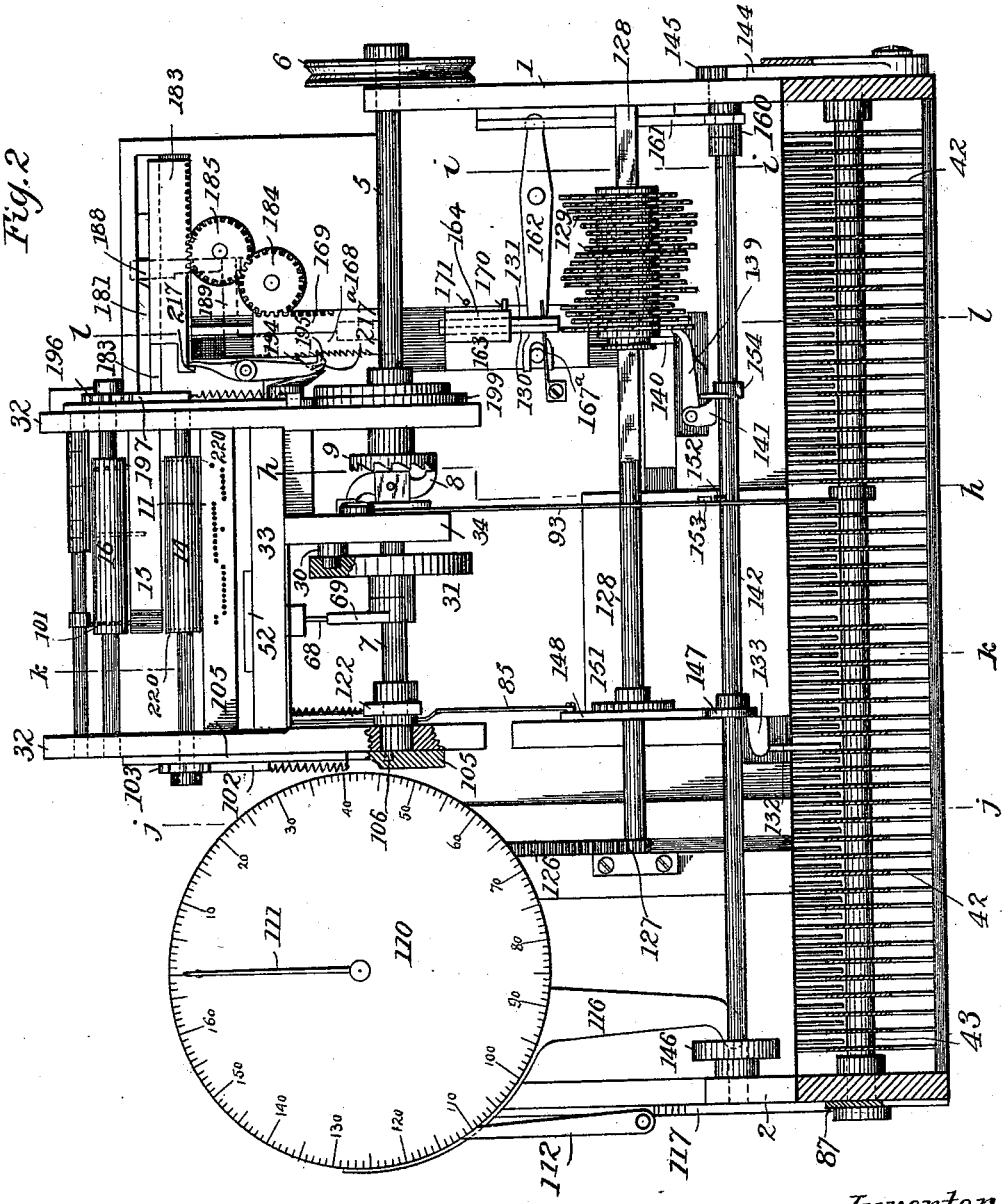
Figure 3:
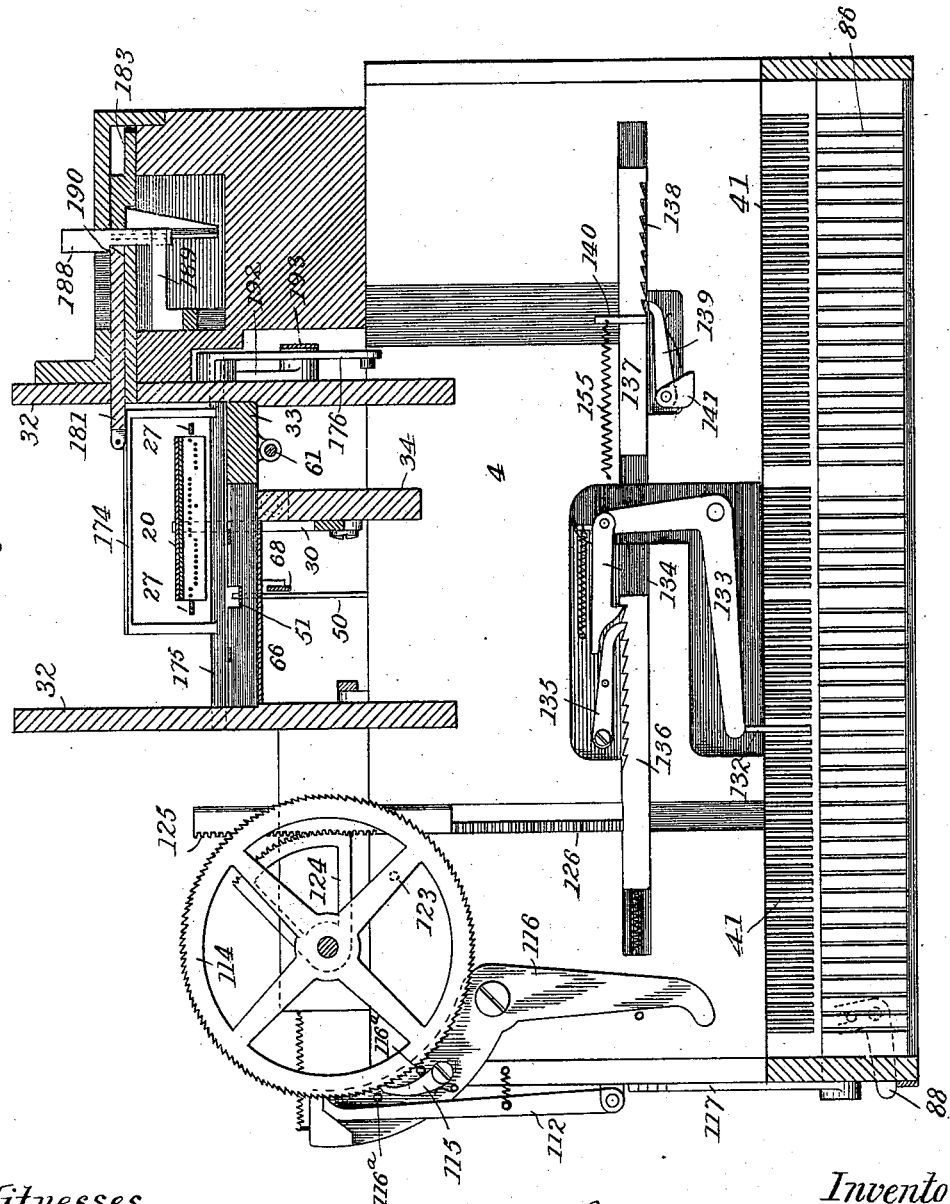
Figure 4:
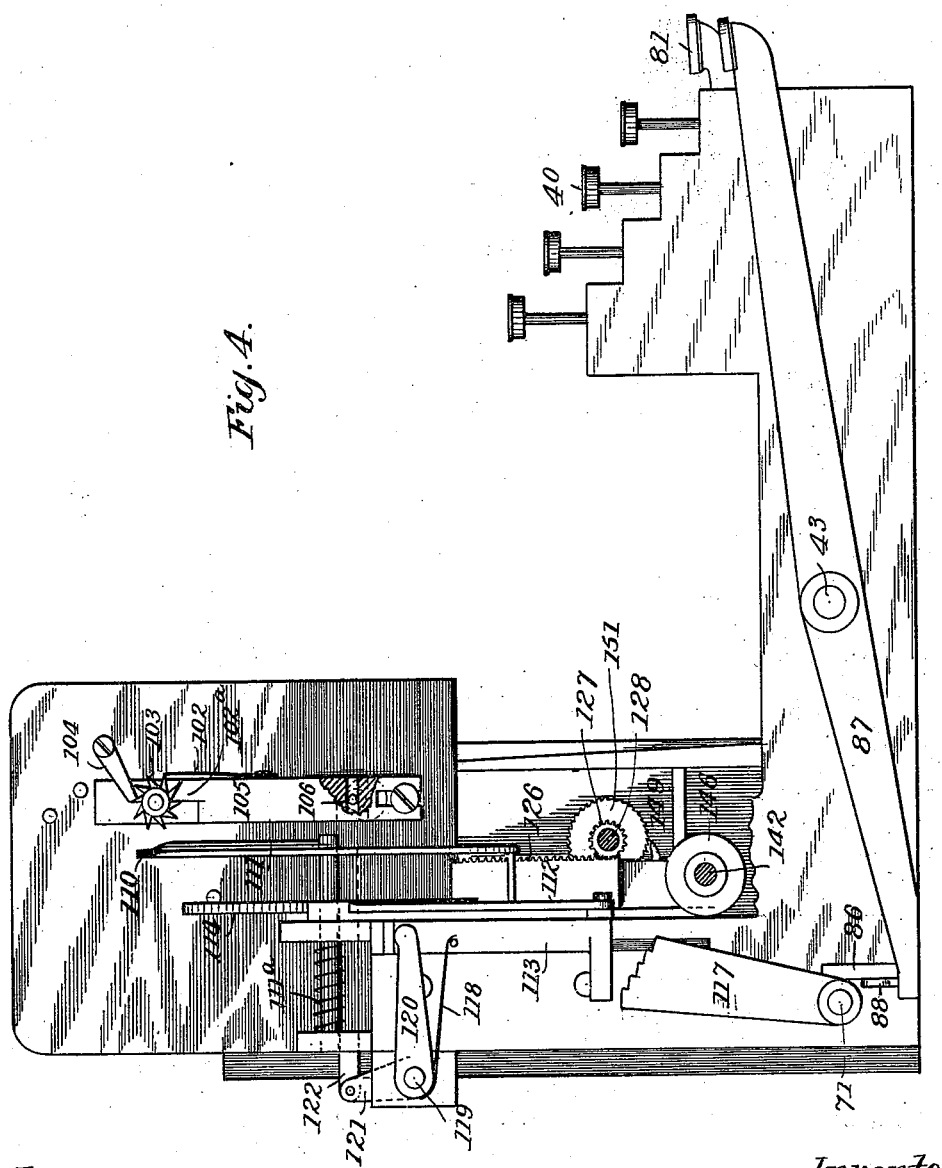
Figure 5:
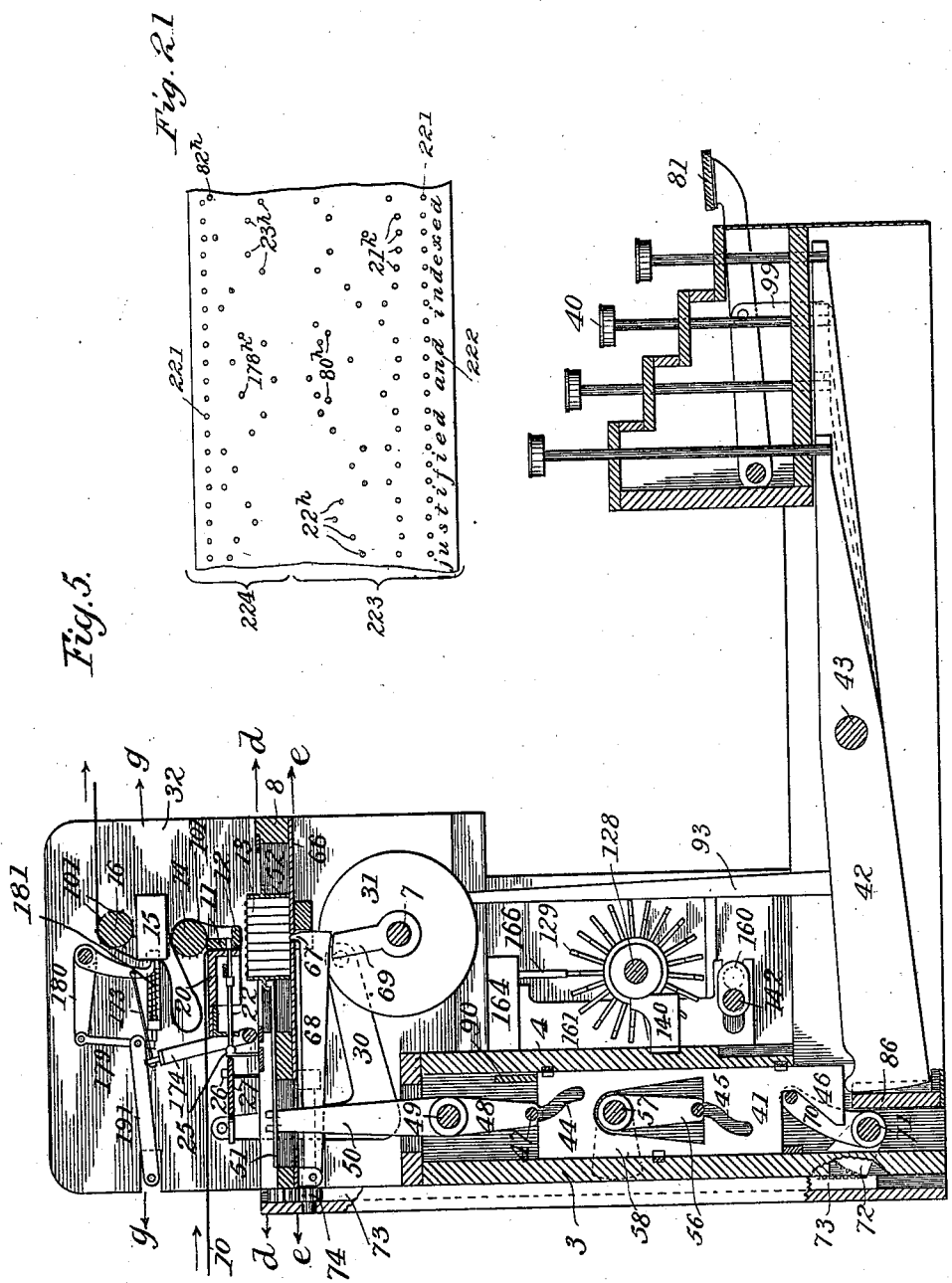
Figure 6:
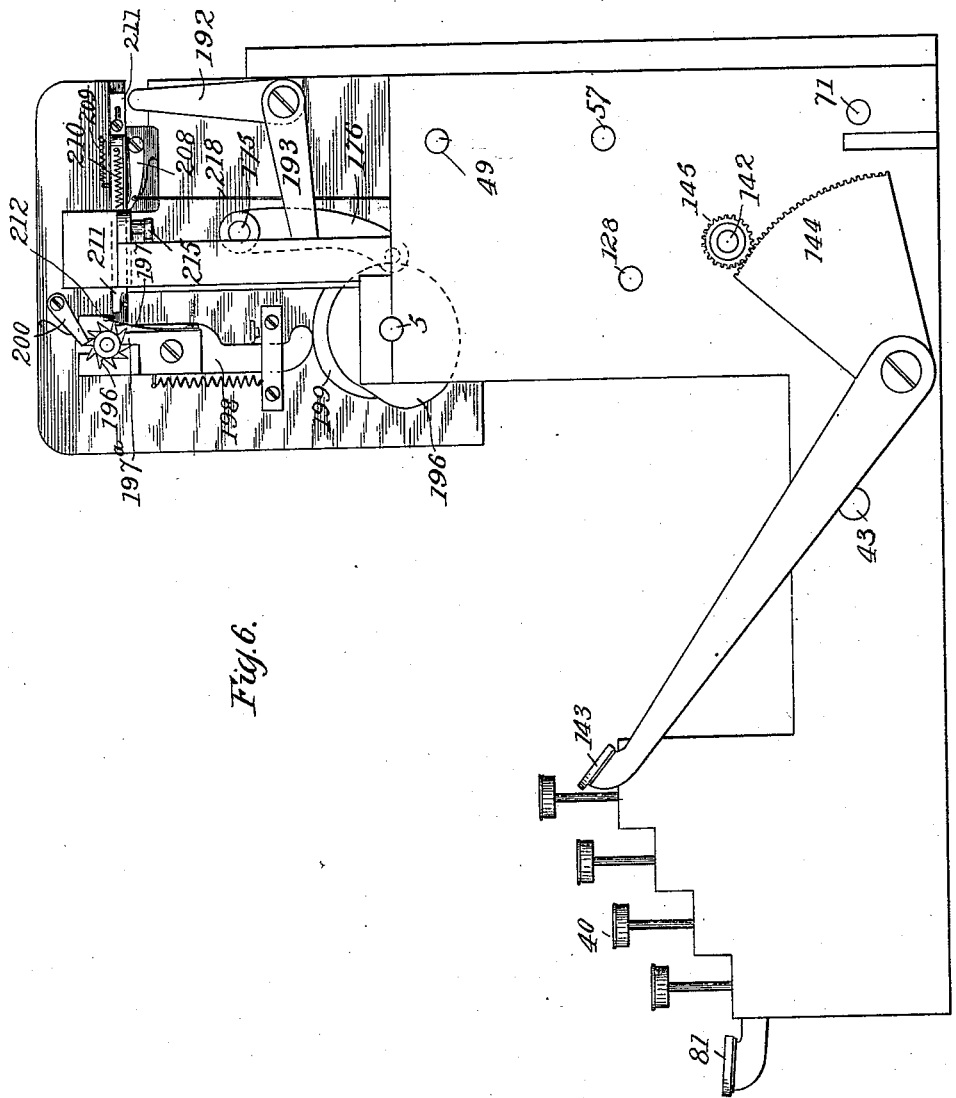
Figure 20:
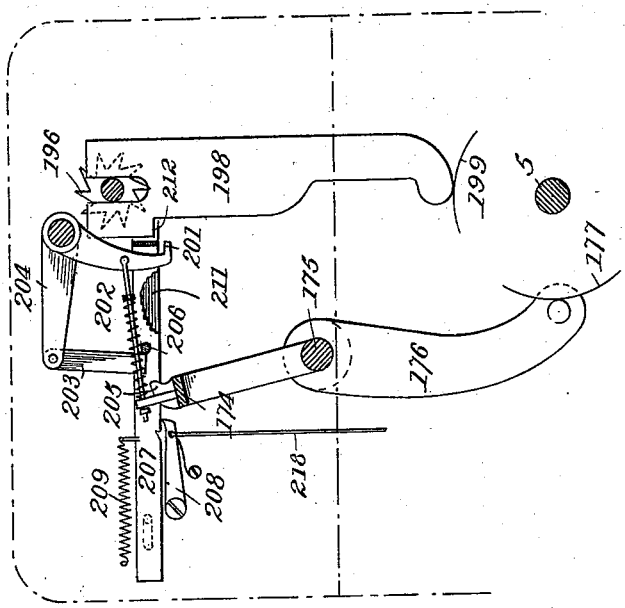
Figure 19:
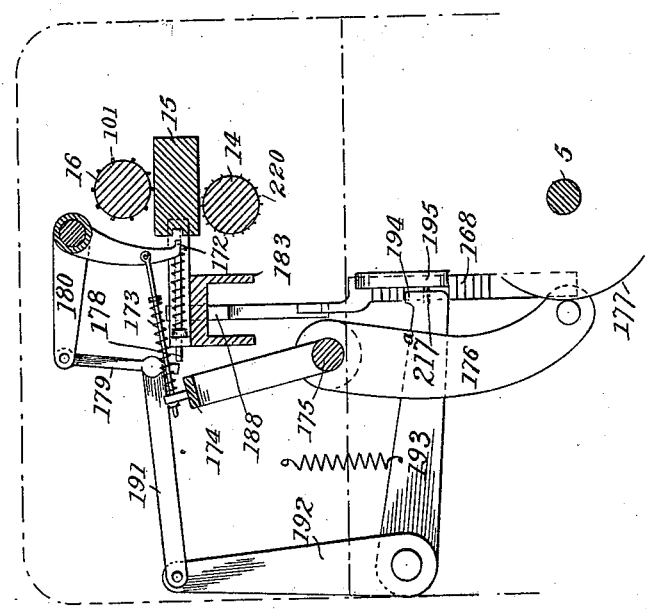

Figure 1 is a plan view of the machine. Fig. 2 is a front elevation, partly broken away and in section along the line $a\ a$ of Fig. 1. Fig. 3 is a sectional elevation on the line $b\ b$ of Fig. 1. Fig. 4 is a view of the left end of the machine, a part of the frame being broken away. Fig. 5 is a view from the left end of the machine, taken on the section-line $c\ c$ of Fig. 1. Fig. 6 is a view of the right end of the machine. Fig. 7 is a view taken about on the line $d\ d$ of Fig. 5. Fig. 8 is a similar view about on the line $e\ e$ of Fig. 5. Fig. 9 is a section on the line $f\ f$ of Fig. 13. Figs. 10 and 11 are detailed views of the interponents and punches. Fig. 12 is a sectional plan on the line $g\ g$ of Fig. 5. Fig. 13 is a plan view of the punches and striker-plate. Fig. 14 is a sectional view on the line $h\ h$ of Fig. 2. Figs. 15, 16, 17, and 18 are partial sectional views on the lines $i\ i$, $j\ j$, $k\ k$, and $l\ l$, respectively, of Fig. 2. Figs. 19 and 20 are diagrammatic views of the devices for operating the justifying-punch. Fig. 21 is a view of a portion of a justified and indexed strip or controller, and Fig. 22 is a plan of a modified form of perforating device.

I shall first describe my improved machine as it is illustrated in the accompanying drawings, and afterward point out some of the various modifications which may be made within the scope and spirit of the invention.

As usual, the various working parts of the machine are mounted upon a main framework, which in this instance is a box-like frame having right and left side plates 1 and 2, the forward projections of which support a bank of keys, a rear plate 3, and a front plate 4. There is a constantly-driven power-shaft 5, which I shall hereinafter term the "running-shaft," driven by a pulley 6, and there is in line with this shaft another intermittently-driven shaft 7, which I shall term an "escape-shaft." Each time that a key-lever is operated a pawl 8 upon the shaft 7 is thrown into engagement with one of the teeth of a ratchet-wheel 9 upon the adjacent end of the running-shaft, and after the escape-shaft has made a complete revolution the pawl 8 is thrown out of engagement with the ratchet-wheel, and the escape-shaft stops until another key is operated. The particular mechanism for engaging and disengaging the pawl 8 will be described later on.

Referring particularly to Fig. 5, it will be seen that the controller-strip 10, of paper or other suitable fabric, passes in from the rear of the machine and then successively in front of a die-plate 11, where holes are punched representing the characters and their spaces, across a platen 12, where the corresponding characters are printed by types 13, over a feed-roll 14, then in front of a die-plate 15, where the justifying-holes are punched, and finally, over a feed-roll 16 and out at the front of the machine. The strip as thus prepared may be called a "justified" and "indexed" controller or mechanical representation of the subject-matter to be afterward in some manner put into type mechanically.

I shall now describe the punches which operate in conjunction with the die-plate 11 and the devices for operating said punches. As shown in Figs. 1, 5, 9, 10, 11, and 13, these punches are arranged in three sets and mounted in a horizontal row in a channel-piece 20. There are two sets of punches 21 and 22 which make the perforations $21^h$ and $22^h$, respectively, Fig. 21 representing the characters, and a set of punches 23, which make the perforations $23^h$ for the character, spaces. These latter perforations control the width of the mold in type-casting machines, the letter-feed of the matrix in matrix-making machines, &c. These punches are operated, respectively, by interponents 24, 25, and 26, which in turn are driven against the punches by a common striker-plate 27. Upon the inner edge of the striker-plate is a yoke-piece 28, (see Figs. 11 and 13,) which as the striker-plate returns engages the projections 29 upon the punches which have been driven and draws them back to their normal positions. The striker-plate is operated once during each revolution of the escape-shaft by means of a bell-crank lever 30, the lower end of which engages with a cam 31 upon the escape-shaft.

The various punches and paper-feeding devices are carried in an upper frame, consisting of side pieces 32, a base or floor piece 33, and a depending plate 34 below the plate 33.

At the front of the machine is a bank of keys 40, similar to type-writer keys, which keys, when depressed, impart an upward movement to their respective slides 41 through the medium of key-levers 42 mounted upon a common fulcrum-rod 43. The slides 41 are arranged in a series at the back of the machine, as shown in Fig. 3 and they are each provided with three cam-slots or cam-surfaces, respectively indicated by 44, 45, and 46, as shown in Fig. 5. These cam-surfaces impart movement to the interponents, whereby the proper punches are selected, corresponding to the key which operates the slide, and they also impart movement to the case which carries the type 13 for indexing the strip. The upper cam-surface 44 of each of the slides engages when the slide is elevated with a rod or bail 47 upon the arms 48 of a rock-shaft 49. Another arm 50 of said rock-shaft extends upward and engages with a slide 51, the forward end of which is connected to the rectangular case 52 in which the type 13 are arranged.

Upon the edge of the slide 51 is a rack which engages with a pinion 53. Another pinion 54, rigidly connected with a pinion 53, engages with a slide 55, which carries the interponent 24. It will thus be seen that the upward movement of a slide, operating through its upper cam-surface 44 and the connections above described, will simultaneously place the interponent 24 in front of a certain punch and select the row of type in the type-holder in which the letter corresponding to said punch is located. The cam-surfaces 45, acting through the rock-arms 56, rock-shaft 57, sector-gear 58, vertical rack 59, and pinion 60, vibrate a rock-shaft 6. (See Figs. 5, 7, and 8.) A pinion 62 upon said latter rock-shaft engages with the rack-teeth upon a slide 63, which carries the interponent 25. Another pinion 64 upon said shaft engages with rack-teeth upon a sliding frame 65, which moves at right angles to the slide 51. The rectangular type-box 52 is free to slide in the frame 65 transversely to the movement of said frame, and it also has a sliding engagement with the forward end of slide 51. Thus the cam-surfaces 45 of the slides determine the positions of the interponent 25, and at the same time complete the selection of the corresponding type in the type-box and bring it to the printing-point. The type 13 rest upon a stationary plate 66, in which there is a perforation opposite the printing-point. A projection 67 upon a lever 68 stands opposite the perforation in the plate 66, and after the proper type has been selected and the escape-shaft released an arm 69 upon said shaft strikes the lever 68 and drives the selected type up against the platen 12. A suitable inking-ribbon should be interposed between the type and the paper; but as this is a common contrivance it has been omitted from the drawings for the sake of clearness. The third cam-surface 46 of each slide operates through rock-arms 70, rock-shaft 71, sector-gear 72, rack 73, pinion 74, shaft 75, and sector-gear 76, which sector-gear engages with slide 77, carrying the interponent 26, which selects the punches for the character-spaces. The rear ends of the key-levers 42 are guided in a slide 86, Figs. 4 and 5, and a key-lever 87 and elbow-lever 88, Figs. 3 and 4, are provided for shifting said slide, so as to shift the rear ends of the key-levers 42 laterally. It is thus possible to operate several sets of slides 41 from one set of keys. In the present instance I employ twice as many slides as there are keys, there being two characters to each key. The interponents 24, 25, and 26 are carried upon spring-arms rigidly attached to their respective slides, and are thus permitted to move laterally a sufficient distance to drive the punches through the paper strip. The interponents 24 and 25 stand normally opposite the middle punches of their respective series, as shown in Fig. 13, while the interponent 26 is normally opposite a blank space at the left of the series of space-punches. Upon the slide 77, which carries the interponent 26, is a second interponent 78, which stands normally in line with the interponent 25. Upon the punch next to the middle one of the series 22 is a shoulder 79, (shown in Fig. 11,) which when said punch is operated engages the interponent 78, provided the latter is in its normal position, and drives a special punch 80, thus punching a trip-hole $80^h$ to bring into operation the justifying-punch, to be hereinafter described. The punch 80 is operated at each movement of the space-key 81, as in that case the interponent 25 moves over opposite the punch having the shoulder 79. Another special punch, which we will call the "line-punch" 82, is brought into action at the end of each line to punch a line or stop-hole $82^h$ by means of an interponent 83, carried by the arm 84 of a rod 85. (See Figs. 2 and 13.) This interponent is operated from the starting-key, as will be explained hereinafter.

Above the series of slides is a bail 90, connected by rods 91 to arms 92, rigid upon the fulcrum-shaft 43, Figs. 5 and 14. A trip-rod 93 has a pin-and-slot connection with a shorter arm 94, which is also rigid upon the shaft 43, and when a slide is raised the shaft 43 is rocked and the trip-rod raised also. The upper end of the trip-rod is located just below the latch 95, which engages with the pawl 8 of the escape-shaft and prevents said pawl from engaging with the wheel 9. When the latch is raised, the lower end of the pawl 8 springs into engagement with the wheel 9 of the running-shaft, and the escape-shaft is carried around until the opposite end of the pawl strikes a fixed cam 96, which again disengages the pawl from the toothed wheel 9. The pawl rides up over cam 96 and onto free end of latch 95 and against a stop-shoulder 95ª. During the revolution of the escape-shaft the lifter 93 is thrown out of engagement with the latch 95 by a cam 97, the end of the lifter passing behind a shoulder 98. By this means the latch is always dropped into position to arrest the escape-shaft after it has made a single revolution. It will also be evident that the escape-shaft will be released each time that a key is struck and one of the slides elevated. For this purpose the space-key is also connected to a slide through the medium of link 99 and one of the key-levers 42.

Upon the striker-plate are two fixed punches 100, which punch holes in the margins of the strip, (see Fig. 13,) and these holes are engaged by projecting pins 101 upon the feed-roll 16, which feeds the paper through the machine. The feed-roll 14 is driven one step for each revolution of the escape-shaft by a spring-pawl 102 acting upon a star-wheel 103 upon the shaft of the feed-roll. Backward movement is prevented by a holding-pawl 104. The pawl 102 is mounted on a vertical slide 105, which is reciprocated by a crank-pin 106 upon the escape-shaft, Figs. 2 and 4.

The spring-pawl 102 imparts a primary movement to the star-wheel, and a rigid tooth 105ª at the upper end of slide 105 imparts additional movement, if necessary, and then locks the star-wheel while the punches enter the paper.

The feed-roll 14 is preferably provided with a row of prickers or needle-points 220 near each end, instead of pins such as are used on feed-roll 16. The feed-roll 14 will thus feed the blank paper at the beginning of a strip, as well as the prepared paper after the perforations are made.

The justifier which I have shown in the accompanying drawings is constructed upon the "quotient and remainder" principle, said justifier being described and broadly claimed in my Patent No. 536,149, issued March 19, 1895. Justification in the final machine is accomplished by adding to each of the word-spaces a uniform amount, and if there be a remainder dividing it into units and adding one unit to each of the word-spaces until the remainder is exhausted. In the present machine holes are punched in the strip corresponding to the amounts which are to be added to the normal spaces in the final machine, so that whatever justifying is necessary is accomplished in the present machine, and its product may be aptly called a "justified strip."

As in other machines of this class I use a dial 110 and pointer 111 to indicate when the lines are nearly full, so that the subject-matter may be properly divided into lines. The divisions of the dial indicate the units of space in a line, and the position of the pointer shows the aggregate amount of matter in the line at any time. The pointer is driven by a pawl 112, Figs. 3 and 4, which is mounted upon a slide 113 and operates upon a ratchet-wheel 114, which is fixed upon the pointer-shaft. There is a holding-pawl 115 mounted upon a lever 116. Upon the lower rock-shaft 71 is mounted an arm 117, having steps at its outer end adapted to intercept the slide 113 at various points and thus vary the throw of the pawl 112. It will be remembered that the rock-shaft 71 is moved more or less each time a key is struck by the cans 46 of the cam-slides which govern the space-punches. In like manner the arm 117 governs the movement of the pointer upon the dial in accordance with the particular character which is struck upon the keys. The slide 113 is moved yieldingly downward by a spring-arm 118 upon a rock-shaft 119 and is carried positively upward by an arm 120 upon the same shaft. The rock-shaft is vibrated by means of an arm 121, connected by a link 122 to a crank-pin upon the escape-shaft. A pin 123 upon the ratchet-wheel 114 engages a sector-gear 124 when the line is nearly full, which gear meshes with a rack 125. Rigidly connected with this rack is a second rack 126, Fig. 3, which engages a pinion 127 upon a justifier-shaft 128. A justifier key-piece 129 is mounted upon the shaft 128, so as to turn with said shaft but having freedom to slide thereon. As shown, the right-hand end of the shaft is square, and the key-piece has a corresponding opening in it. This key-piece has a number of projecting pins corresponding to the various amounts of word-space in different lines and the various numbers of word-spaces into which said space must be distributed. By the rotation of the justifier-shaft 128 the key-piece is turned, so as to bring the proper pin in line with the setting transfer-slides 130 131, and by devices to be presently described the key-piece is moved longitudinally upon its shaft a distance corresponding to the number of word-spaces in the line, thus bringing the proper pins of the key-piece under the setting-slide to give the setting for said lines.

Upon the cam-slide of the space-key is a projection 132, which, acting through an elbow-lever 133, moving-pawl 134, and holding-pawl 135, feeds forward a ratchet-bar 136, Figs. 2 and 3. This bar in turn communicates motion to a second and independent bar 137, which has ratchet-teeth 138 and a holding-pawl 139. The bar 137 has a pin 140, which engages with the justifier key-piece 129 and moves it lengthwise of the justifier-shaft 128. Rigid with the pawl 139 is an arm 141, for a purpose which will be hereinafter explained. As the bar 136 travels toward the right it carries forward the bar 137 and the justifier key-piece, and as it travels to the left it leaves bar 137 until the latter is released by the starting-key. The bar 137 and justifier are thus set for one line of matter while the bar 136 is being set for the succeeding line.

Below the justifier-shaft and parallel thereto is a starting-shaft 142, which is given one complete revolution at the end of each line by means of a starting-key 143, sector-gear 144, and pinion 145, the latter being upon the right-hand end of the starting shaft, Figs. 2 and 6. At the left end of the starting-shaft is a cam 146, which rocks the lever 116, so that pins 116$^a$ upon said lever throw the pawls 112 and 115 out of engagement with the ratchet-wheel 114, Fig. 3, thus permitting the pointer to be returned to zero upon the dial and the rack 126 and justifier-shaft to be returned to their normal positions by the spring 111$^a$, coiled about the pointer-shaft, Figs. 4 and 16. A second cam 147 upon the starting-shaft, Figs. 2 and 17, raises a slide 148, thus permitting a pawl 149, which is urged upward by a spring 150, to engage a ratchet-wheel 151 upon the justifier-shaft, locking said shaft while the setting transfer-slides are in contact with the justifier key-piece. To the slide 148 is also connected the rod 85, which sets the interponent 83 for the line-punch 85, thus bringing said punch into operation each time the starting-key is depressed at the end of a line. A pin 152 on the starting-shaft raises a link 153, Figs. 2 and 14, which link is connected to the lifting-bar 93. The escape-shaft is thus released for the purpose of operating the punch 82 to punch the line-hole. A cam 154 upon the starting-shaft operates at the proper time upon the arm 141, thus withdrawing the retaining-pawl 139 from the teeth 138 and permitting the spring 155 to return the bar 137 to engagement with the ratchet-bar 136 and the justifier key-piece to its normal or starting position.

At the right-hand end of the starting-shaft is a crank 160, which engages a slot in the lower end of a slide 161, Figs. 2, 15, and 18. The upper end of the slide 161 engages one end of a lever 162, while the opposite end of said lever is connected with a vertically-moving slide 163.

In a box-like projection 164 of the slide 163 is mounted the setting transfer-slides 130 131, each having ratchet-teeth 165 on its rear edge and a downwardly-projecting leg 166 located directly over the justifier-shaft and the justifier key-piece. When the starting-shaft is at rest, the slides 130 131 are in the positions as set by the justifier key-piece for the line last finished. After the next line is finished and the justifier key-piece set accordingly the starting-shaft is revolved by the starting-key. During the first part of the revolution the slide 163 moves upward and transfers the setting previously obtained from the justifier key-piece to the slides 168 169. At the uppermost point of the travel of the slide 163 a pin 170 upon the holding-pawl 167 comes in contact with a fixed pin 171, and the pawl is thrown out of engagement with the teeth of the slides 130 and 131, thus permitting them to return to their lowest or normal positions. During the last half of the revolution of the starting-shaft the slide 163 moves down and the legs of the setting-transfer slides 130 131 rest upon a pair of pins in the justifier key-piece and are set to control the justifier-punch for the line just finished. At this point a spring 167$^a$ throws the pawl 167 into engagement with the teeth 165 of the setting transfer-slides. During the last quarter-revolution of the starting-shaft the slide 163 rises to its middle position, and it remains in this position until the succeeding line is finished, when the same cycle of operations is repeated. It will thus be seen that the setting transfer-slides receive a setting from the justifier key-piece for a particular line and hold that setting during the time a succeeding line is being impressed upon the controller-strip. In this manner the justifying-punch is always at least one line behind the character-punches and the character-impression devices do not interfere with the justifying, there being usually a considerable loop of the controller-strip between the two mechanisms. As the paper strip 13 passes the die-block 15, a feeler 172 is yieldingly pressed against it by a spring connection 173 with a constantly-moving bail 174. The arms of the bail 174 are connected to a rock-shaft 175, which has a depending arm 176 in contact with a cam 177 upon the running-shaft 5. The bail 174 vibrates back and forth opposite the end of the justifying-punch 178, but without effect upon said punch, excepting when the interponent 179 is placed between. The feeler 172 is in line with the holes 80$^h$ in the paper made by the space-indicating punch 80, and when one of said holes comes opposite the feeler the latter drops into it, and the interponent 179, which is carried by an arm 180 connected with the feeler, drops in between the bail and the punch, thus punching a hole 178$^h$ in the strip opposite to the space-indicating hole 80$^h$. The holes made by the justifying are in such positions upon the strip as to select proper spaces in the composing-machine to cause the lines to justify. The manner of controlling the position of this punch will now be described. The justifying-punch 178 is mounted in a slide 181, having a slit 182 at the lower end of the punch through which the paper strip passes. The punch-slide 181 is carried bodily by a carriage 183, Figs. 2, 3, 12, and 19. The position of the punch on the paper strip is determined primarily by the rack 169, Fig. 2, acting through the gears 184 185 upon the carriage 183 and carrying the punch to its desired initial position upon the paper. The spring 186, Fig. 12, tends to return the carriage to its normal position, and the spring 187 constantly draws the punch-slide back against a variable stop-piece 188, Figs. 3 and 12. This stop-piece rests against an arm 189 of the slide 168, and it is raised with said slide, as heretofore described. The stop-piece 188 has two widths differing by a step 190. The lesser width permits the punch-slide to move a distance sufficient to punch holes for spaces one unit larger than when the slide is stopped by the greater width. When the slides 168 169 are raised by the starting-shaft, the carriage 183 is thrown over until the punch is in position to punch holes for the quotient-spaces, the punch-slide resting against the greater width of the stop 188. At the same time the said stop is raised a greater or less amount, depending upon the number of quotient-spaces.

As heretofore described, the space-punch is driven each time the feeler 172 finds a perforation in the paper strip. When this occurs the interponent 179 drops in front of the moving bail 174, Fig. 19, and a link 191, connected with 179, rocks an arm 192, which in turn rocks an arm 193, having a pawl 194, which, with a holding-pawl 195, feeds up the bar 168, supporting the stop-piece 188. The initial setting of the slide 168 is such that the stop-piece must be fed up as many notches as there are quotient-spaces in the line before the punch-slide passes over the step 190 and shifts the punch to position to make holes corresponding to quotient plus one unit of remainder spaces. The remainding space-holes in the line will be of the latter kind. The feed-roll 16 is driven by a star-wheel 196 and spring-pawl 197 and fixed pawl 197$^a$ upon a slide 198, operated by a cam 199 upon the moving shaft, Figs. 2 and 6. The pawls 197 197$^a$ move and lock the star-wheel in the same manner as the pawls 102 and 102$^a$. A holding-pawl 200 prevents a backward movement of the feed-roll.

To stop the feed-roll at the end of each line, I employ a feeler 201, which is yieldingly pressed against the paper by the spring-pitman connection 202 with the bail 174. This feeler works opposite the line-stop holes made by the special punch 82, and when it drops into one of said holes an interponent 203, carried by an arm 204, connected with the feeler, drops in between lug 205 on the bail 174 and a pin 206 upon a slide 207, and the movement of the bail throws the slide forward, and it is held in its forward position by a spring-latch 208. When the slide 163, Fig. 18, is in its lowest position, a flexible connecting strip or cord 218, attached to the slide 163, unlocks the pawl 208, and the slide 207 is retracted by a spring 209, thus starting the justifying-punch mechanism.

Parallel with the slide 207 and connected thereto by a spring 210 is a bolt 211, Figs. 6 and 12, which, when the slide is thrown forward by the interponent 203, passes under a shoulder 212 upon the slide 198 and stops its motion and that of the feed-roll 16. The spring 210 connects a pin 210$^a$ on the slide 207 with a similar pin 210$^b$ on bolt 211, the pin 210$^a$ extending through a slot in bolt 211, as shown in Fig. 18. It will be evident that should the slide 198 be down when the bolt 211 is thrown against it the latter will remain pressing against the slide, and when it rises will pass under the shoulder 212 and stop its motion. As the bolt 211 is thrown forward by the slide 207, a shoulder 213 upon a pawl attached to said bolt, Fig. 12, strikes a pin in the rear end of retaining-pawl 215, which holds the carriage 183, and releases said carriage, permitting the spring 186 to return the carriage to its normal position. As the carriage reaches its normal position a pin 216 in the punch-slide strikes the free end of pawl 214 and releases the pawl 215, ready for action when the starting-shaft is again operated. As the carriage 183 returns to its normal position the slide 169 is carried down by the gears 184, 185. At the same time the projection 217 on carriage 183 strikes the tail end of pawl 195, Fig. 2, and a pin 217$^a$ in the lower end of said pawl lifts pawl 194, and thus frees slide 168 and permits it to drop.

Fig. 21 shows a section of a justified and indexed controller-strip. It is provided with feed-holes 221 and the index-letters 222. In the longitudinal section of the strip marked 223 are two perforations arranged transversely for each letter indicated in the index, and in the space marked 224 there is another perforation for each letter representing the space to be occupied by the letter in the final composition, and there are also in this section perforations between the words indicating the proper spaces to justify the lines.

In Fig. 22 I have shown a modification of the perforating device in which the several sets of punches are dispensed with, and punches are placed directly upon the interponents 24$^a$, 25$^a$, and 26$^a$, corresponding to the interponents 24, 25, and 26 of Fig. 13. These interponents are placed in the same manner as those previously described and are driven by a common striker plate 27$^a$. The feed-hole punches 100 are fixed upon the striker, as usual.

The operation of my machine is as follows: The strip of paper is first passed through the machine and engaged with the feed-rolls, as indicated in Fig. 5. Upon pressing a character-key its corresponding slide is raised by the key-lever, and the cam-surfaces 44 45 swing the rock-shafts 49 57, and through the intermediate connection the interponents 24 25 are placed opposite punches which will perforate holes to represent the character upon the strip. At the same time these rock-shafts through other connections move the case of type in the type-writer until the character corresponding to the key is brought opposite the plunger 67. Simultaneous with these movements the cam-surface 46 of the slide, acting through the rock-shaft 71 and other connections, places the interponent 26 opposite one of the punches 23, which will perforate the strip at a point corresponding to the width of space required by the character. The stepped arm 117, carried by the rock-shaft 71, is thrown over more or less, according to the width of the character. As the slide 41 reaches its highest position, the bail 90 rocks the shaft 43 and raises the rod 93 and latch 95, permitting the escape-shaft to make a complete revolution. One effect of this revolution of the escape-shaft is to move the striker-plate and drive the punches opposite the interponents, thus perforating the strip for the character selected and its space. Another effect is to operate the plunger 67 and print the character upon the strip. The strip is then fed forward after the punches are withdrawn to present a new surface for perforation. Another effect of the revolution of the escape-shaft is to force the slide 113 down until stopped by the stepped piece 117 and then to raise it again, thus feeding the index forward upon the dial a distance corresponding to the width of the character as determined by the stepped arm 117. The perforations produced by the operations above described will in the composing-machine select the desired character and give it its proper space. It now remains to provide for justification—that is, to so perforate the strip that the lines of characters produced in the composing-machine will be justified. There are various justifying mechanisms which might be embodied in the present machine to produce a justified controller-strip. The one illustrated in the present case is based on the quotient and remainder principle, which is fully described in my patent hereinbefore referred to. This form of justifier distributes the space necessary to fill out the line or surplus space in the word-spaces only. Thus, for instance, if there are ten units of surplus space and four word-spaces in a line it will add the quotient of ten divided by four or two units to each word-space in the line, and to two of these word-spaces it will also add the two units (one to each) constituting the remainder. The justifier key-piece 129 has a number of pairs of pins, the pins of each pair corresponding, respectively, to the surplus space and the number of word-spaces in a given line, and the whole number of pairs of pins, which are of various lengths, represent all of the combinations which may occur in ordinary printed matter. The key-piece is set for each line of subject-matter, so as to bring the proper pair of pins under the setting transfer-slides, which transfer the setting from the key-piece to the justifying-punch. The key-piece has two movements—a rotary movement corresponding to the surplus space in a line, which is transmitted from the dial mechanism, and a longitudinal movement on its axis, which is transmitted from the space-key and which corresponds to the number of word-spaces in the line. At the end of each line the starting-key is depressed, which turns the starting-shaft a complete revolution. One effect of the revolution of the starting-shaft is to raise the interponent 83 and trip the escape-shaft, thereby operating the punch 82 and making a perforation in the strip to indicate the end of a line. Another effect is to throw the pawls out of engagement with the ratchet-wheel of the indicator and permit the index to return to zero. The principal effect of the revolution of the starting-shaft is to raise the setting transfer-slides into contact with the slides which control the justifying-punch, and after the said slides are set the transfer-slides are lowered and reset by the key-piece for the following line, after which they are raised to mid-position and remain there until the starting-key is again operated. During that portion of the revolution of the starting-shaft in which the setting just described is taken from the key-piece the key is locked against movement in either direction. During the latter part of the revolution of the starting-shaft the key-piece is released, and it is thereupon returned to its initial position by suitable springs, one of which returns the index of the dial and rotates the justifier-shaft, while the other returns the rack 137. The slide 169, which is set by the transfer-slide 131, locates the justifier-punch 178 in position to make perforations corresponding to the quotient-spaces. Slide 168 sets the stop 188, so that the step 190 is as many notches below the punch-carrier 181 as there are quotient-spaces in the line. Each time that the justifier-punch makes a perforation for a quotient-space the slide 168 and stop 188 are raised one notch by the pawl 194, and as the last perforation is made the step 190 permits the punch-carrier to move over to the position shown in Fig. 3, and thereafter the perforations made by the punch correspond to a space equal to the quotient plus one unit of remainder. The justifier-punch only operates when the feeler 172 drops into one of the word-space perforations made by the special punch 80. When the end of a line of subject-matter is reached, the feeler 201 drops into the perforation made by special punch 80, and the bolt 311 is thrown under the shoulder 212 of the slide 198, thereby stopping the justifying-punch mechanism until the succeeding line is ready for justification. When the starting-shaft is again operated, the pawl 208 is drawn down by the connection 218, thus releasing the bolt 211 and starting the justifying-punch mechanism. It will be seen that while the character and character-space punches are being operated upon a given line by means of the key-levers the second preceding line is being automatically justified, the latter operation requiring no attention beyond the depression of the starting-key at the completion of the line.

While I have limited the description of my invention to the preparation of a perforated paper strip-controller, it will be evident that most of the mechanism described might be utilized for the production of other forms of preliminary representation. For instance, instead of perforations I may make slits in the paper or emboss it, or I may utilize the machine to depress pins which are held frictionally in a strip or plate, such as the controller illustrated in my pending application, Serial No. 478,649, filed June 23, 1893. Furthermore, I believe myself to be the first to use a justifying mechanism in the preparation of a controller, and considering my invention in its broader aspects the particular form of the justifier and the particular nature of the controller are immaterial.

Without therefore limiting myself to the precise construction and arrangement of parts shown and described, I claim—

1. The combination with character keys and with slides provided with several sets of cam surfaces, of mechanisms for making character selecting impressions and corresponding space impressions upon a controller strip, said mechanisms being controlled by different sets of the cam surfaces through intermediate connections, substantially as described.

2. The combination with character keys and with slides provided with cam surfaces, of two sets of punches for making character selecting impressions upon a controller strip, a striker for operating the punches, and interponents for selecting the punches, said interponents being controlled by the cam surfaces through intermediate connections, substantially as described.

3. The combination with character keys and with slides provided with several sets of cam surfaces, of punches for making character selecting impressions and corresponding character space impressions, mechanisms controlled by the cam surfaces for rendering selected punches operative, and a common striker for all of said punches, substantially as described.

4. The combination with character keys and with slides provided with cam surfaces, of punches for making character and character space selecting impressions, a striker for operating the punches, interponents for selecting the punches, said interponents being controlled by the cam surfaces through intermediate connections, an escape shaft and connections between said shaft and the striker, and means for releasing said shaft when a key is operated, substantially as described.

5. The combination with character keys and with slides provided with cam surfaces, of punches for making character and character space selecting impressions, interponents for selecting the punches, rock shafts having arms and bails operated by the cams, and connections between the rock shafts and the interponents, substantially as described.

6. The combination with a set of keys and key levers, and with slides provided with cam surfaces, of mechanism for making character selecting impressions upon a controller, and a typewriter for recording the characters upon the strip, said mechanism and typewriter being simultaneously controlled by the cam surfaces through intermediate connections, substantially as described.

7. The combination with a set of keys and key levers, and with slides provided with cam surfaces, of two sets of punches for making character selecting impressions upon a controller, a striker for operating the punches, interponents for selecting the punches, and a typewriter arranged to record the characters upon the strip, said interponents and typewriter being controlled by the cam surfaces through intermediate connections, substantially as described.

8. The combination of a set of keys and key levers, of two sets of punches for making character selecting impressions upon a controller strip, two interponents for selecting said punches, a set of type mounted in a sliding frame, and having a movement therein transverse to that of the frame, a rock shaft having a rocker arm connected with one interponent and the type case, and a second rock shaft connected with the second interponent and with the sliding frame, substantially as described.

9. The combination with a set of keys and key levers, and with slides provided with character selecting and spacing cam surfaces, of means controlled by the spacing cams for making space selecting impressions upon a controller, and a space counting dial and index also operated by the spacing cams, substantially as described.

10. The combination with a set of keys and key levers, and with slides provided with character selecting and spacing cam surfaces, of means controlled by the spacing cams for making space selecting impressions upon a controller, a space counting dial and index, and a justifier, said space counter and justifier being also controlled by said spacing cams, substantially as described.

11. The combination with the justifier shaft and the justifier key-piece arranged to slide upon and turn with said shaft, of the starting shaft and means operated by the starting shaft and constructed to lock the justifier key-piece to prevent movement in either direction while its setting is being transferred, substantially as described.

12. The combination with the justifier key-piece and mechanism for moving said key-piece in two directions in accordance with the amount of character space and number of word spaces in a line respectively, of a justifying impression device, a movable holder therefor, and means for setting the holder in accordance with the setting of the key-piece, substantially as described.

13. The combination with the justifier key-piece movable in two directions, of the justifying impression device and movable carrier therefor, the stop for said carrier having a step or shoulder, a pair of slides connected respectively to said carrier and stop, and means for transferring the setting of the key-piece to said slides, substantially as described.

14. The combination with the justifier key-piece movable in two directions, of the justifying impression device and carrier therefor, the stop for said carrier having a step or shoulder, a pair of slides connected respectively to said carrier and stop, and a corresponding pair of setting transfer-slides mounted in a movable frame and adapted to be set by the key-piece and transfer said setting to the slides connected with the carrier and stop, substantially as described.

15. The combination with the justifying impression device and carrier therefor, and the stop for said carrier having a step or shoulder, of a pair of slides connected respectively to said carrier and stop, the slide for the stop being provided with ratchet teeth, an interponent arranged to bring the impression device into operation and a pawl connected to the interponent and operating upon the teeth of the stop slide, whereby the latter is moved each time the impression device is operated, substantially as described.

16. The combination with means for making an impression in a controller to indicate word spaces, a justifying impression device and means for feeding the controller to said device, of a constantly moving striker in the rear of the impression device, a feeler having a yielding connection with said striker and arranged to vibrate in the path of said impressions and an interponent connected with the feeler and adapted to interpose between the striker and the impression device each time the feeler finds an impression, substantially as described.

17. In a machine of the class described, the combination with means for feeding a strip of paper, punches for making character selecting impressions in the strip, and character keys and connections for selecting the punches, of an adjustable punch for making justifying impressions in said strip, and means for automatically adjusting said punch relatively to the strip, and operating the same at the completion of a line of character impressions, whereby the justifying impression or impressions for the line are automatically added to the strip, substantially as described.

In testimony whereof I affix my signature in presence of two witnesses.

FRANK AMOS JOHNSON.

Witnesses:
J. S. BRAND,
R. H. SANFORD.